US008968809B2

(12) United States Patent
Imison

(10) Patent No.: US 8,968,809 B2
(45) Date of Patent: Mar. 3, 2015

(54) FOAMING COFFEE COMPOSITION

(75) Inventor: Thomas Philip Imison, Banbury (GB)

(73) Assignee: Kraft Foods R & D, Inc., Deerfield, IL (US)

( * ) Notice: Subject to any disclaimer, the term of this patent is extended or adjusted under 35 U.S.C. 154(b) by 0 days.

(21) Appl. No.: 12/921,707

(22) PCT Filed: Mar. 12, 2009

(86) PCT No.: PCT/US2009/036964
§ 371 (c)(1),
(2), (4) Date: Jan. 12, 2011

(87) PCT Pub. No.: WO2009/114694
PCT Pub. Date: Sep. 17, 2009

(65) Prior Publication Data
US 2011/0097458 A1 Apr. 28, 2011

(30) Foreign Application Priority Data

Mar. 12, 2008 (GB) .................................. 0804618.7

(51) Int. Cl.
| A23C 9/00 | (2006.01) |
| A23C 1/06 | (2006.01) |
| A23F 5/42 | (2006.01) |
| A23F 5/40 | (2006.01) |

(52) U.S. Cl.
CPC .... *A23F 5/42* (2013.01); *A23F 5/40* (2013.01)
USPC .......................................... 426/285; 426/385

(58) Field of Classification Search
CPC ..................................... A23F 5/42; A23F 5/40
See application file for complete search history.

(56) References Cited

U.S. PATENT DOCUMENTS

| 3,485,637 A | 12/1969 | Adler et al. |
| 3,652,293 A | 3/1972 | Lombana et al. |
| 3,706,572 A | 12/1972 | Einstman et al. |
| 3,804,963 A | 4/1974 | Boleslaw Sienkiewicz et al. |
| 5,008,125 A | 4/1991 | Cale et al. |
| 5,589,590 A | 12/1996 | Ledon et al. |
| 5,750,178 A | 5/1998 | Cheng et al. |
| 5,882,716 A | 3/1999 | Munz-Schaerer et al. |
| 5,882,717 A | 3/1999 | Panesar et al. |
| 6,129,943 A | 10/2000 | Zeller et al. |
| 6,174,557 B1 | 1/2001 | Gamez-Rumpf et al. |
| 6,180,159 B1 * | 1/2001 | Villagran et al. ............. 426/590 |
| 6,713,113 B2 | 3/2004 | Bisperink et al. |
| 2002/0127322 A1 * | 9/2002 | Bisperink et al. ............. 426/570 |
| 2003/0005826 A1 | 1/2003 | Sargent et al. |
| 2003/0157235 A1 * | 8/2003 | Maier et al. .................... 426/594 |
| 2006/0040033 A1 | 2/2006 | Zeller |
| 2006/0040034 A1 * | 2/2006 | Zeller et al. .................... 426/564 |
| 2006/0040038 A1 | 2/2006 | Zeller et al. |
| 2008/0069924 A1 * | 3/2008 | Zeller et al. ....................... 426/61 |
| 2008/0160139 A1 * | 7/2008 | Imison et al. .................... 426/96 |
| 2009/0232954 A1 * | 9/2009 | Imison .......................... 426/569 |
| 2011/0097458 A1 | 4/2011 | Imison |

FOREIGN PATENT DOCUMENTS

| CN | 2689710 Y | 4/2005 |
| DE | 197 00 084 A1 | 7/1998 |
| EP | 1 021 957 A1 | 7/2000 |
| EP | 1 198 992 A1 | 4/2002 |
| EP | 1228694 A1 * | 8/2002 |
| EP | 1627568 | 2/2006 |
| GB | 1369816 A * | 10/1974 |
| JP | S62-39602 A | 2/1987 |
| JP | 63-148938 A | 6/1988 |
| JP | 63148938 A * | 6/1988 |
| JP | H07-107 A | 1/1995 |
| JP | 2001-017106 A | 1/2001 |
| WO | WO 2007097626 A1 * | 8/2007 |

OTHER PUBLICATIONS

European Patent Office Extended European Search Report dated Jul. 8, 2009 for European Application No. 09250705, 6 pages.
A. S. Ginsburg et al., State and Development of the Technology of Manufacturing Instant Coffee (Review), Moscow, 1971, title page and p. 22, with informal English translation of the third paragraph on p. 22.
United Kingdom Intellectual Property Office Combined Search and Examination Report under Sections 17 and 18(3) for United Kingdom Application GB 0804618.7 dated Jun. 18, 2008, 2 pages.
PCT International Search Report for International Application PCT/US2009/036964 dated Apr. 17, 2009, 3 pages.
PCT International Preliminary Report on Patentability for International Application PCT/US2009/036964 dated Sep. 14, 2010, 5 pages.

* cited by examiner

*Primary Examiner* — Michele L Jacobson
*Assistant Examiner* — Subbalakshmi Prakash
(74) *Attorney, Agent, or Firm* — Fitch, Even, Tabin & Flannery LLP

(57) ABSTRACT

The present invention provides a foaming instant coffee composition comprising particles having a bulk density of from 0.16 to 0.45 g/cm$^3$, said particles comprising a continuous phase comprising an instant coffee matrix and a non-continuous phase comprising particles of a foamable component containing a gas.

14 Claims, No Drawings

FOAMING COFFEE COMPOSITION

This application is a U.S. national phase application filed under 35 U.S.C. §371 of International application PCT/US2009/036964, filed on Mar. 12, 2009 designating the United States, which claims the benefit of Great Britain Application No. 0804618.7, filed on Mar. 12, 2008, which is hereby incorporated by reference herein.

The present invention relates to a foaming coffee composition and to a process for the preparation thereof. More particularly, the invention relates to a foaming instant coffee composition, such as a freeze-dried or agglomerated granular instant coffee composition, which, when hot water is added thereto, provides a coffee drink having a foam on the surface thereof.

Instant coffee compositions are well known. In essence instant coffee is the dried water-extract of roasted, ground coffee. The beans used to make instant coffee are blended, roasted and ground as they are in the making of regular coffee. In order to make instant coffee, the roasted, ground coffee is then charged into columns called percolators through which hot water is pumped, resulting in a concentrated coffee extract. The extract is then dried to produce the final coffee composition which is sold to the consumer. The composition may also be blended with other ingredients such as a dairy or non-dairy creamer and/or a sweetener if desired.

The concentrated coffee extract is usually dried by spray drying or freeze drying. In general freeze drying provides a superior product which is more attractive in appearance than spray dried instant coffee and has better flavour since freeze drying does not subject the coffee composition to the elevated temperatures necessary for spray drying.

In some circumstances it is desired to provide an instant coffee composition which is foaming, that is to say which has a foam on the surface thereof after it is reconstituted with hot water. Such a foam may, for example, simulate the foam formed on an espresso drink made from roasted and ground espresso coffee to a greater or lesser extent, or may simply provide a different mouthfeel or drinking experience to the consumer.

A foaming spray-dried powdered coffee composition is disclosed in, for example, U.S. Pat. No. 5,882,717. In the process described in this reference a coffee extract is foamed by a gas injection, the foamed extract is homogenised to reduce the gas bubble size and the homogenised extract is spray-dried to obtain particles having gas bubbles incorporated therein, the majority of the gas bubbles having a size of 10 microns or less. This process provides a foaming spray-dried instant coffee composition but it cannot be used for a freeze dried coffee composition since the spray-drying is an essential step to retain the gas bubbles in the coffee composition. Since spray-dried powder produced in this manner is dried from an emulsion of gas bubbles dispersed in a continuous liquid phase, the emulsion being formed by the injection of gas into the liquid, it is contemplated that certain surface-active chemical species present in the liquid will as a result of their chemical and physical properties, become distributed at the interface between the liquid and the entrained gas bubbles during emulsion formation.

In the particular case of coffee, it is believed that such compounds include polysaccharides found in the water soluble extract of roasted coffee beans. The emulsion that is formed by gas injection is subsequently dried to form a powdered product, by evaporation of water during spray drying, and hence is it contemplated that the afore-mentioned chemical species will remain at the surface of the closed pores present inside the dried powder particles to a certain extent. When the powder is reconstituted, entrapped gas from inside the particles is released and forms a foam layer on the surface of the beverage. It is contemplated that the relatively high concentration of the afore-mentioned surface-active chemical species at the internal surface of the closed pores inside the particles may facilitate the formation and stabilisation of the foam layer on the beverage surface, thus helping to provide an increased volume of foam.

Instant spray-dried coffee powders produced in this manner typically have a bulk density in the range of about 0.12 to about 0.25 g/cm$^3$, an average particle size of about 100-150 μm, and a closed pore volume of up to about 1.0 ml/g. Such powders readily dissolve when reconstituted with hot water, forming an attractive foam layer on the beverage surface.

In a freeze-dried soluble coffee granule, only a fraction of the internal pores are formed as a result of the entrainment of gas bubbles into the soluble coffee extract prior to freeze-drying. The remainder of the pores in a freeze-dried instant coffee granule are formed as a result of the sublimation of ice crystals during freeze-drying. It is contemplated that pores formed in this manner may not contain the necessary level of surface active species at the pore surface to facilitate foam formation and stabilisation upon beverage reconstitution and may therefore contribute to the poorer foam performance of freeze-dried coffee granules as opposed to gas-injected spray-dried coffee powder.

EP-A-1,627,568 provides a foaming coffee composition which may be produced by spray-drying or freeze-drying. According to the process described in this reference a previously prepared soluble coffee composition, which may be prepared by freeze-drying or spray-drying, is heated under sufficient pressure to force gas into internal voids of the dried soluble coffee, the heated dried soluble coffee is cooled and then depressurised. Since the temperature to which the composition is heated under pressure is above the glass transition temperature of the composition, the resultant coffee particles have a surface substantially free from voids and the gas remains entrapped within internal voids after the composition is cooled and depressurised. By this method the cooled coffee particles have internal voids (also referred to as closed pores) filled with a pressurised gas. In the case of freeze-dried soluble coffee granules, it is thought that additional internal voids are formed inside the granules as a result of the heating process. When the composition has water added thereto, it provides a foaming coffee drink. However, although this method may use a freeze-dried coffee as a starting material, the final composition has different characteristics to a freeze-dried coffee composition as conventionally sold to a consumer. In particular, the composition does not have the usual, attractive appearance of a freeze-dried composition since it is much darker, having been subjected to the further process conditions set out above. Furthermore, the density of the composition is substantially increased. For instance in Example 8 of EP-A-1,627,568 a freeze-dried coffee composition having a bulk density of 0.24 g/cm$^3$ is converted to a foaming coffee composition having a bulk density of 0.63 g/cm$^3$. Such a composition may not be particularly suitable or acceptable as an instant coffee composition to be sold to a consumer. Coffee compositions should ideally have a bulk density of from 0.16 to 0.45 g/cm$^3$, more preferably 0.16 to 0.30 g/cm$^3$, or more preferably 0.19 to 0.25 g/cm$^3$ to be commercially satisfactory since then a standard teaspoonfull will provide a coffee drink with an appropriate strength which the consumer expects. A coffee composition having a significantly higher bulk density would provide a coffee drink which would likely be too strong for the average consumer. For the same reasons, some consumers prefer a coffee having a bulk density of 0.16 to 0.30 g/cm³.

There is therefore a need to provide an instant coffee composition having the look and approximate bulk density of a standard freeze-dried coffee composition but which also provides a foaming effect when hot water is added thereto. The present invention provides such a composition and a process for preparing said composition.

The present invention provides a foaming instant coffee composition comprising particles having a bulk density of from 0.16 to 0.45 g/cm³, said particles comprising a continuous phase comprising an instant coffee matrix and a non continuous phase comprising particles of a foamable component containing a gas.

In a first embodiment, the present invention provides a foaming freeze-dried instant coffee composition comprising particles having a bulk density of from 0.16 to 0.45 g/cm³, said particles comprising a continuous phase comprising a freeze-dried instant coffee matrix having entrapped therein a non-continuous phase comprising particles of a foamable component containing a gas. Preferably the foamable component has closed pores containing a gas and/or comprises a clathrate containing a gas. Preferably the foamable component has closed pores, and the composition particles have a closed pore volume of at least 0.10 cm³/g.

In a second embodiment the present invention provides a foaming instant coffee composition comprising particles having a bulk density of from 0.16 to 0.45 g/cm³, said particles comprising a continuous phase comprising agglomerated instant coffee particles and a non-continuous phase comprising particles of a foamable component containing a gas. Preferably, the foamable component has closed pores containing a gas and/or comprises a clathrate containing a gas. Preferably, the foamable component has closed pores, and the composition particles have a closed pore volume of at least 0.10 cm³/g.

The present invention further provides a process for preparing a composition as defined above in particular a composition of the first embodiment, which comprises:
  i. mixing the particles of a foamable component with an aqueous coffee extract to form a coffee mixture;
  ii. before the particles of the foamable component have dissolved, freezing the coffee mixture;
  iii. granulating the frozen coffee mixture; and
  iv. forming a freeze-dried coffee composition by removing water by sublimation.

The present invention yet further provides a process for preparing a composition as defined above, in particular a composition of the second embodiment, which comprises:
  i. mixing the particles of a foamable component with instant coffee particles;
  ii. agglomerating the mixture of instant coffee particles and particles of a foamable component to form agglomerated particles having a continuous phase comprising the instant coffee particles and a
non-continuous phase comprising the particles of a foamable component; and
  iii. drying the agglomerated particles.

The present invention also provides a process for preparing a coffee drink which comprises adding hot water to a composition as defined above.

The composition of the present invention has a bulk density of from 0.16 to 0.45 g/cm³, which is an appropriate bulk density for coffee compositions sold to the average consumer. The coffee composition also has the usual characteristics associated with a freeze-dried instant coffee composition such as the same or substantially the same visual characteristics and taste characteristics. In addition the composition has the advantage that it is foaming.

A simple test method can be used to measure the amount of foam generated by compositions of the present invention upon re-constitution, hereinafter referred to as the quantitative in-cup foam test. The method is based on using a 100 cm³ glass measuring cylinder of 25 mm diameter and 250 mm height, into which 1.8 g coffee is weighed, and then 70 cm³ of water at 80° C. is poured onto it from a beaker through a funnel at the top of the measuring cylinder over a period of about 5 seconds. The funnel used consists of a conical section of base diameter 50 mm and height 40 mm, connected to a tubular section of internal diameter 5 mm and length 50 mm. The purpose of the funnel is to control the addition of water used to reconstitute the composition. The foam volumes generated by the composition upon reconstitution are noted at 1 & 10 minute time intervals. All measurements are carried out in duplicate.

Typical results are shown below in Table 1.

TABLE 1

| Sample | Foam volume (cm³) 1 minute | Foam volume (cm³) 10 minutes |
| --- | --- | --- |
| Commercially available foaming spray-dried coffee | 4.5 | 3.0 |
| Non-foaming spray-dried coffee powder | 0.0 | 0.0 |
| Commercially available agglomerated instant coffee granules | 0.0 | 0.0 |
| Commercially available freeze-dried coffee A | 1.5 | 0.5 |
| Present invention granules control sample (made following the method of Example 1 but without addition of foamable component) | 0.5 | 0 |
| Present invention granules made using coffee foamable component (Example 1) | 3.0 | 1.0 |
| Present invention granules made using maltodextrin-based foamable component (Example 2) | 4.0 | 1.75 |
| Present invention granules made using maltodextrin-based foamable component (Example 3) | 4.0 | 1.75 |
| Present invention granules made using alpha-cyclodextrin-$CO_2$ clathrate crystal foamable component (Example 4) | 2.75 | 1.5 |
| Present invention granules made using coffee foamable component (Example 5) | 5.0 | 1.0 |

The composition of the present invention, in particular of the first embodiment, may be prepared by a modification of the standard procedure for preparing a freeze-dried coffee composition in such a process an aqueous coffee extract, for example containing from 20 to 60 wt % coffee solids, preferably from 40 to 50 wt %, is foamed, for example by in with a gas such as nitrogen and subjected to mixing in, for example, a high sheer mixer. The bulk density of the finished freeze-dried coffee product may be controlled by altering the bulk density of the foamed coffee extract prior to freezing, by increasing or decreasing the volume of gas injected into the extract. This composition is then slab-frozen and then granulated. The granules are then freeze-dried by substantially removing the water by sublimation in a vacuum or partial vacuum to provide the freeze-dried coffee composition. Such a composition does not retain any substantial foaming capacity since there is little or no internal closed pore volume containing a gas. The pores which remain in the particles are substantially open to the atmosphere since it is from these pores that the water is removed to the atmosphere during the freeze-drying process.

It has been found that conventional freeze-dried coffee compositions typically have a closed pore volume of less than about 0.1 cm$^3$/g, usually less than about 0.05 cm$^3$/g. Table 2 (below) lists the closed pore volume of some conventional commercially available freeze-dried coffee compositions. Foaming spray-dried coffee compositions, such as those described in U.S. Pat. No. 5,882,717, by contrast typically have a closed pore volume of up to about 1.0 cm$^3$/g

TABLE 2

| Coffee | Closed pore volume (cm$^3$/g) |
|---|---|
| Kraft coffee 1 | 0.06 |
| Kraft coffee 2 | 0.04 |
| Kraft coffee 3 | 0.02 |
| Kraft coffee 4 | 0.03 |
| Kraft coffee 5 | 0.04 |
| Kraft coffee 6 | 0.06 |
| Kraft coffee 7 | 0.04 |
| Kraft coffee 8 | 0.02 |
| Kraft coffee 9 | 0.03 |
| Kraft coffee 10 | 0.04 |
| Nestle coffee | 0.07 |

Closed pore volume can be measured by the following method. Firstly, it is necessary to measure the skeletal density (g/cm$^3$) of the material by measuring the volume of a weighed amount of powder or granules using a helium Pycnometer (Micromeritics AccuPyc 1330) and dividing weight by volume. Skeletal density is a measure of density that includes the volume of any voids present in the particles that are sealed to the atmosphere and excludes the interstitial volume between particles and the volume of any voids present in the particles that are open to the atmosphere. The volume of sealed voids, referred to herein as closed pore volume, is derived from also measuring the skeletal density of the powder or granules after grinding with mortar and pestle to remove or open all internal voids to the atmosphere. This type of skeletal density, referred to herein as true density (g/cm$^3$) is the actual density of only the solid matter comprising the powder or granules. Closed pore volume (cm$^3$/g) is determined by subtracting the reciprocal true density (cm$^3$/g) from the reciprocal skeletal density (cm$^3$/g). Optionally the closed pore volume can also be expressed as volume percent of closed pore volume contained in the particles comprising the powder or granules. The percent closed pore volume is determined by subtracting the reciprocal true density (cm$^3$/g) from the reciprocal skeletal density (cm$^3$/g) and then multiplying the difference by skeletal density and 100%.

In the first process of the present invention the aqueous coffee extract is formed in the same or a similar manner as in the standard procedure for preparing a freeze-dried coffee composition. Thus roasted, ground coffee is extracted with hot water to prepare a coffee extract. This coffee extract may be further concentrated or diluted with water if desired. The aqueous coffee extract preferably comprises from 20 to 60 wt % coffee solids, more preferably from 40 to 50 wt % coffee solids. The aqueous coffee extract may, for example, simply comprise the extracted coffee and water, or further components may be added such as a non-dairy creamer, a dairy creamer or a natural or artificial sweetener. It is also possible to add one or more flavouring agents to the extract. Using a high concentration of coffee solids in the aqueous coffee extract, for example greater than 40% wt % coffee solids, is preferred, since at this high solids concentration there will be less water available to dissolve the foamable component. Using an aqueous coffee extract with a high wt % of coffee solids will also increase the viscosity of the aqueous coffee extract, which will decrease the propensity of the coffee extract to wet and dissolve the foamable component.

Using a coffee extract with a low wt % of coffee solids increases the total volume of ice crystals in the extract and therefore increases the open pore volume of the freeze-dried coffee granules, but does not increase the closed pore volume.

The aqueous coffee extract may be cooled before the foamable component is mixed therein. For example the aqueous coffee extract may be cooled to a temperature of 5° C. or less, 0° C. or less, −5° C. or less, −10° C. or less, −15° C. or less or −20° C. or less. It is desirable to cool the aqueous coffee extract in order to reduce the propensity or to prevent the foamable component from dissolving therein. Cooling the aqueous coffee extract increases the viscosity, and cooling to below the point at which ice begins to form in the extract will increase the effective solids concentration of the liquid portion of the aqueous coffee extract as the ice crystals are formed. Both of these effects reduce the propensity of the foamable component to dissolve, and the foamable component therefore retains a greater degree of structure and foaming properties after mixing into the extract and subsequent freeze-drying. The aqueous coffee extract is desirably injected with a gas such as nitrogen and subjected to mixing before the foamable component is added thereto in a conventional manner. By injecting a gas into the composition voids are created which facilitate the eventual freeze-drying process and help to give the granules an acceptable solubility upon reconstitution. The injection and dispersion of gas into the aqueous coffee extract prior to freezing can also be used in the standard process for the freeze-drying of coffee by one skilled in the art in order to control the bulk density of the freeze-dried coffee product. A bulk density of about 0.16 to about 0.45 g/cm$^3$ is preferred, with a bulk density of about 0.16 to about 0.30 g/cm$^3$ being more preferred, with a bulk density of about 0.19 to about 0.25 g/cm$^3$ being even more preferred.

The foamable component is mixed with the aqueous coffee extract to form a coffee mixture. It is essential that the foamable component does not completely dissolve otherwise no foaming property will be retained. It is, however, possible that some dissolution may take place so long as the final composition which is prepared is still foaming. In order to prevent the foamable component from dissolving in the aqueous coffee extract it is desirable for the particles of the foamable component to be cooled before they are added to the aqueous coffee extract. Desirably the particles of foamable components are cooled to a temperature of 5° C. or less, more preferably 0° C. or less, even more preferably −20° C. or less and yet further preferably −40° C. or less, most preferably −60° C. or less. The particles of foamable component may, for example, be cooled by placing them in a cooling gas or liquid such as liquid nitrogen.

In order to ensure that the particles of foamable component do not completely dissolve the mixing step is desirably carried out in a short time, for example two minutes or less, preferably one minute or less. Suitable equipment for mixing the foamable component with the aqueous coffee extract includes, for example, machines such as the MHD series of powder/liquid mixers from IKA Works (USA) or the Hoyer Addus FF range of dosing and mixing equipment from Tetra-Pak Hoyer A/S (Denmark). It is contemplated that continuous in-line mixing, immediately followed by freezing increases the chance of the particles of foamable component retaining their structure and therefore their foaming properties, including the gas entrapped in the closed pores or clathrate crystals, by limiting the time available for wetting of the particles of foamable component before freezing and therefore enhances the foaming performance of the subsequent freeze-dried beverage composition upon reconstitution.

The coffee mixture is then subjected to a freeze-drying process. This may be a conventional freeze-drying process of the type used for preparing freeze-dried instant coffee. Thus the coffee mixture may, for example, be slab-frozen in a freezing tunnel. Subsequently the frozen coffee mixture is granulated and water removed by sublimation in a vacuum or partial vacuum.

The coffee composition obtained comprises the freeze-dried instant coffee in the form of a matrix having entrapped therein particles of the foamable component having closed pores or clathrates containing a gas. The freeze-dried matrix (continuous phase) will not contain a substantial number of closed pores. The foaming effect of the composition is provided by the discrete particles of a foamable component. When a foamable component comprising particles with closed pores containing a gas is used, the closed pore volume of the final composition is at least 0.1 cm$^3$/g of the composition in order to provide an acceptable foaming quality. Preferably it is at least 0.2 cm$^3$/g, and more preferably greater than 0.3 cm$^3$/g.

In a second embodiment of a process of the present invention, a water, preferably steam, agglomeration process is used. In this embodiment the process comprises:
 i. mixing the particles of a foamable component with instant coffee particles;
 ii. agglomerating the instant coffee particles to form agglomerated particles having a continuous phase comprising instant coffee particles and a non-continuous phase comprising particles of a foamable component; and
 iii. drying the agglomerated particles.

The instant coffee particles may be, for example, spray-dried, freeze-dried, extruded or oven-dried coffee particles. The particles may be milled in order to reduce the primary particle size. Thus, for example, the particles may have a size of less than 200 µm, for example less than 100 µm, or less than 0.50 µm, or less than 20 µm.

The instant coffee particles are used in excess relative to the particles of a foamable component, to ensure that the instant coffee particles provide the continuous phase.

The agglomeration may, for example, be carried out using a liquid such as water or another binding agent, a non-re-wet process as described in EP-A-1,280,412 or by heat and/or pressure. The water, if used, may be in the form of a liquid, but is preferably in the form of steam. Any known method of water or steam agglomeration may be used, but preferably a steam-let type agglomeration method is used. In this method the mixture of particles is allowed to fall through a grid and is impinged by a flow of steam. The temperature of the steam can be above 100° C., for example above 105° C. or above 110° C.

The agglomerated particles are then dried, for example using hot air, for example having a temperature of greater than 100° C., for example above 105° C., although the temperature and flow of air can be adjusted by one skilled in the art in order to increase or decrease the drying time. The water content of the final composition is desirably less than 10 wt %, more preferably less than 5 wt %.

It is possible to ensure that the agglomerated particles resemble conventional freeze-dried coffee granules by appropriately selecting the dimensions of the apertures of the grid through which the mixture of particles is allowed to fall. For example, a grid with square apertures of side length 2.5 cm produces agglomerated granules which are of the same general appearance and bulk density as standard freeze-dried coffee granules. Using a grid with a smaller aperture size, for example square apertures of side length 1.5 cm, produces agglomerated granules which have a higher bulk density than standard freeze-dried granules, for example greater than about 0.3 g/cm$^3$. However these granules still produce a foam layer when re-constituted with hot water due to the presence of the foamable component.

The foamable component having closed pores containing a gas may take a variety of forms. Thus it may, for example, be a coffee composition such as an instant coffee composition, for example a spray-dried instant coffee composition, in particular a spray-dried instant coffee powder. It may also be a composition containing little or no coffee such as a carbohydrate-based composition, for example a spray-dried carbohydrate-based composition such as a spray-dried carbohydrate-based powder. The foamable component may also comprise carbohydrate, protein, and/or mixtures thereof. The foamable component may optionally include a dispersed fat in addition to carbohydrate and/or protein.

Suitable carbohydrates include, for example, sugars (such as glucose, fructose, sucrose, lactose, mannose, and maltose), polyhydric alcohols (such as glycerol, propylene glycol, polyglycerols, and polyethylene glycols), sugar alcohols (such as sorbitol, mannitol, maltitol, lactitol, erythritol, and xylitol), oligosaccharides, polysaccharides, starch hydrolysis products (such as maltodextrins, glucose syrups, corn syrups, high-maltose syrups, and high-fructose syrups), gums (such as xanthan, alginates, carrageenans, guar, gellan, locust bean, and hydrolyzed gums), soluble fibers (such as inulin, hydrolyzed guar gum, and polydextrose), modified starches (such as physically or chemically modified starches that are soluble or dispersible in water), modified celluloses (such as methylcellulose, carboxymethyl cellulose, and hydroxypropylmethyl cellulose) and/or mixtures thereof.

Suitable proteins include, for example, milk proteins, soy proteins, egg proteins, gelatin, collagen, wheat proteins, hydrolyzed proteins (such as hydrolyzed gelatin, hydrolyzed collagen, hydrolyzed casein, hydrolyzed whey protein, hydrolyzed milk protein, hydrolyzed soy protein, hydrolyzed egg protein, hydrolyzed wheat protein, and amino acids), and/or mixtures thereof.

Suitable fats include, for example, fats, oils, hydrogenated oils, interesterified oils, phospholipids, and fatty acids derived from vegetable, dairy, or animal sources, and fractions or mixture thereof. The fat may also be selected from waxes, sterols, stanols, terpenes, and fractions or mixtures thereof.

Optionally, the foamable component may be substantially carbohydrate-free and/or substantially protein-free (such as a soluble coffee powder, for example). Preferred substantially carbohydrate-free and/or substantially protein-free foamable components include those described in U.S. Patent App. Publication. Nos. 2006/0040033, 2006/0040034, and 2006/0040038. Examples of such foamable components are set forth below in Table 3 with their respective estimated glass transition temperatures. As used herein, the carbohydrate-free foamable components used in this invention preferably comprise less than about 1 wt %, preferably less than about 0.5 wt %, and more preferably less than 0.1 wt % carbohydrate. Especially preferred carbohydrate-free compositions of this invention are devoid of carbohydrate. The protein-free foamable components of this invention comprise less than about 1 wt %, preferably less than about 0.5 wt %, and more preferably less than about 0.1 wt % protein. Especially preferred protein-free foamable components of this invention are devoid of protein.

TABLE 3

| | Tg (° C.) |
|---|---|
| Substantially Protein-Free | |
| 10 DE Maltodextrin | 65 |
| 92% 33 DE Glucose SS<br>8% Modified Food Starch | 74 |
| 92% 18 DE Maltodextrin<br>8% Modified Food Starch | 100 |
| 98.5% 33 DE Glucose SS<br>1% Polysorbate 20<br>0.5% Propylene Glycol Alginate (PGA) | 68 |
| 82% 33 DE Glucose SS<br>8% Modified Food Starch<br>10% Hydrogenated Soybean Oil | 65 |
| Substantially Carbohydrate-Free | |
| Hydrolyzed Gelatin | 70 |
| Hydrolyzed Sodium Caseinate | 69 |
| Carbohydrate-Protein Mixture | |
| 52% Lactose and 33 DE Glucose SS<br>47% Skim Milk Powder<br>1% Disodium Phosphate | 61 |
| Soluble Coffee | |
| Spray-Dried | 51 |
| Gas-Injected Spray-Dried | 74 |
| Gas-Injected Extruded | 73 |
| Freeze-Dried | 60 |

Compositions are expressed as % dry weight basis; SS = Syrup Solids; exact proportions of ingredient components can be varied; Tg can vary substantially and is a function of composition and moisture level; physical properties can vary greatly and are determined by processing methods and conditions used to manufacture ingredients; this list of examples is non-limiting.

Preferably, the foamable component comprises an ingredient or mixture of ingredients selected such that the structure of the foamable component is sufficiently strong to retain the entrapped gas at superatmospheric pressure.

The foamable component may also be a particulate ingredient having a plurality of internal voids containing an entrapped supercritical fluid, for example having a critical temperature of at least 10° C. Such a component may be prepared by contacting a supercritical fluid having a critical temperature of at least 10° C. with a particulate ingredient, such as coffee or a carbohydrate or any of the above components, having a glass transition temperature above ambient temperature at a temperature above the glass transition temperature of the particulate ingredient, wherein the particulate ingredient comprises a plurality of internal voids, holding the particulate ingredient at a temperature above the glass transition temperature of the particulate ingredient for a period of time effective to allow transfer of the supercritical fluid into the plurality of internal voids of the particulate ingredient and reducing the temperature to below the glass transition temperature of the particulate ingredient, thereby entrapping at least a portion of the supercritical fluid in the particulate ingredient.

The foamable component may also be a clathrate, which is a crystalline solid or molecular crystal comprising one or more gas molecules of a different chemical composition. Examples are described in U.S. Pat. No. 5,589,590 and Japanese patents Nos. 62039602 and 63143938. Particularly preferred are α-cyclodextrin-gas clathrates, with the gas selected from $N_2O$, $CO_2$, $N_2$, or $O_2$. Clathrates may be prepared by contacting the solid such as the α-cyclodextrin in solution with the gas under suitable conditions of temperature and pressure.

Additional optional ingredients include, for example, artificial sweeteners, emulsifiers, stabilizers, thickeners, flowing agents, colours, flavours, aromas, and the like. Suitable artificial sweeteners include saccharin, cyclamates, acesulfame, L-aspartyl based sweeteners such as aspartame, and mixtures of these. Suitable emulsifiers include monoglycerides, diglycerides, lecithin, diacetyl tartaric acid esters of mono-diglycerides (DATEM), stearoyl lactylates, modified food starches, polysorbates, PGA, sucrose esters, and mixtures thereof. Suitable stabilizers include dipotassium phosphate and sodium citrate. Suitable flowing agents include, for example, sodium silica aluminate, silicon dioxide, and tricalcium phosphate.

The foamable component is desirably prepared by the method disclosed in EP-A-1,627,568. In this method the component, preferably a dried soluble coffee component, is heated under sufficient pressure to force gas into internal voids thereof, the heated dried composition is cooled and then depressurised, wherein the depressurised cool composition has voids filled with a pressurised gas. Desirably the composition is heated to above the glass transition temperature in order to facilitate this process. The glass transition temperature (Tg) marks a second-order phase change characterized by transformation of the powder composition from a rigid glassy particulate solid state to a softened rubbery particulate solid state. This softened rubbery particulate solid state is clearly distinguished from a liquefied melt state (in which all heated particles would be united into a homogeneous viscous fluid). In general, gas solubilities and diffusion rates are higher in materials at or above the Tg. The Tg is dependent on chemical composition and moisture level and, in general, lower average molecular weight and/or higher moisture will lower Tg. The Tg can intentionally be raised or lowered by simply decreasing or increasing, respectively, the moisture content of the powder using any suitable method known to one skilled in the art. The Tg can be measured using established differential scanning calorimetry or thermal mechanical analysis techniques. A suitable temperature is from 20 to 150° C., preferably 40 to 130° C. A suitable pressure is from 20 to 3000 psi, preferably from 100 to 2000 psi. The gas used to fill the voids of the composition may be, for example, air but is desirably nitrogen. The foamable component can also contain within the internal voids a liquid in equilibrium with a gas phase, or a supercritical fluid at a temperature and pressure greater than the thermodynamic critical point of the fluid. Any entrapped fluid can optionally contain additives such as flavourings which are soluble in the fluid. The foamable component is desirably a coffee composition such as a spray dried, gas injected spray-dried, gas injected extruded or freeze-dried coffee. Most preferably it is a spray-dried coffee.

In general the final composition comprises from 10 to 50 wt % of the foamable component, preferably from 15 to 50 wt %, more preferably from 20 to 30 wt % thereof. It has been found that even with this amount of foamable component in the composition the composition still has the look and general taste of a conventional freeze-dried coffee composition. The amount of foamable component needed to provide an acceptable foaming quality will depend on the performance and physical characteristics, such as particle size and shape, of the foamable component. For example, a foamable component with a lesser propensity to completely dissolve when wetted through contact with water, for example during mixing with aqueous coffee extract or during contact with steam, will retain more foaming properties after drying and therefore deliver a product with an enhanced foaming quality.

The bulk density of the final composition is from 0.16 to 0.45 $g/cm^3$, preferably 0.15 to 0.30 $g/cm^3$, more preferably from 0.19 to 0.25 g/cm$^3$, and even more preferably from 0.20 to 0.24 g/cm$^3$. The tapped bulk density is generally from 0.17 to 0.32 g/cm$^3$, preferably from 0.20 to 0.26 g/cm$^3$. This is approximately the same as a standard freeze-dried coffee composition. Thus a consumer may simply use the composition in the same amount as would normally be used for a conventional freeze-dried composition.

Although the bulk density and tap density of the final composition is approximately the same as a standard freeze-dried coffee composition, the skeletal density of the final composition is typically lower than a standard freeze-dried coffee composition, due to the presence of gas-filled closed pores of lower density than the surrounding coffee matrix, said gas-filled closed pores formed by entrapping particles of the foamable component within the coffee matrix. The skeletal density of the final composition is typically below about 1.3 g/cm$^3$, whereas the skeletal density of freeze-dried coffee granules is typically above about 1.4 g/cm$^3$. The true density of soluble coffee is typically about 1.5 g/cm$^3$.

The foaming freeze-dried coffee composition may be diluted with hot water in the conventional manner to form a coffee drink having a foam on the upper surface thereof. It has been found that this foam is retained even when the coffee drink is stirred.

The present invention will be further described in the following Examples:

EXAMPLES

Example 1

This example demonstrates the benefits of the present invention in instant freeze-dried soluble coffee reconstituted with 200 cm$^3$ of hot (85° C.) water in a 250 cm$^3$ beaker having a 65 mm internal diameter.

Instant freeze-dried soluble coffee was prepared according to the following procedures. First an aqueous coffee extract was produced by dissolving 240 g of instant freeze-dried coffee granules, of moisture content about 2% by weight, in an equal quantity of hot water. This aqueous coffee extract was then cooled to a temperature of about 5° C. The cooled aqueous coffee extract was then foamed to a density of about 0.8 g/cm$^3$ by the introduction of nitrogen gas whilst being subjected to mixing at a high shear level in order to uniformly disperse the entrained gas bubbles within the cooled aqueous coffee extract. The foamed aqueous coffee extract was then further cooled to a temperature of about −10° C., and further mixed to ensure homogeneity.

A foamable component was prepared according to the following procedures. First, a quantity of a porous spray-dried soluble coffee powder (having a mean particle size (D50) of about 200 μm as measured by laser diffraction with 0%>500 μm) containing a plurality of closed pores was loaded into a pressure vessel. This soluble coffee powder had a glass transition temperature (Tg) of about 60° C. and closed pore volume of about 0.75 cm$^3$/q. The pressure vessel, was pressurised with nitrogen to a pressure of about 40 bars gauge.

The vessel was then heated by means of an external heating jacket to a temperature in excess of 90° C., above the glass transition temperature of the soluble coffee. The vessel and contents were held at this temperature for a period of about 10 minutes. The vessel was then cooled to a temperature of about 30° C., below the glass transition temperature of the soluble coffee, thus trapping a portion of nitrogen at superatmospheric pressure inside the closed pores of the spray-dried soluble coffee powder. The vessel was depressurised and the soluble coffee powder was unloaded. When 3 g of this soluble coffee powder containing entrapped nitrogen at superatmospheric pressure was reconstituted as described above, the height of the foam (measured between the surface of the liquid and the top of the foam) was in excess of 10 mm. In contrast, the height of the foam created without addition of the pressurized powder was about 1.5 mm. Knowledge of the foam density and incremental foam volume was used to estimate the amount (corrected to room temperature and pressure) of gas released by the foaming agent to at least about 15 cm$^3$ per gram of powder at ambient temperature (25° C.)

The foamable component was cooled to a temperature of about −65° C. and 160 g of the foamable component was mixed by hand (using a spoon) into the cooled foamed aqueous coffee extract. This mixing process took about 2 minutes. The resulting mixture was then further cooled to a temperature below about −30° C. in order to form a solid slab, by passing the solid slab through a CES linear freezing tunnel. The freezing tunnel uses the vaporisation of liquid nitrogen both to produce a flow of cooled air which is blasted at the slab by means of a series of fans, and to directly cool the product by vaporisation of liquid nitrogen on the product surface inside the freezing tunnel. The freezing tunnel was set to operate at an internal air temperature of −70° C., and the slab residence time in the tunnel was set to approximately 4 minutes. The slab was passed through the tunnel three times to ensure complete freezing. After freezing, the solid slab was stored overnight in a freezer at a temperature of about −65° C., before being granulated using a granulator located inside a cold-room at about −40° C. Water was then removed from the resulting granules by the sublimation of ice to water vapour through the standard process of freeze-drying under partial vacuum.

The resulting freeze-dried coffee product was then sieved in order to separate any particles less than 500 μm from the freeze-dried coffee granules, which closely resembled standard commercial freeze-dried coffee granules. The granules had a bulk density of 0.228 g/cm$^3$, a tapped bulk density of 0.237 g/cm$^3$, a skeletal density of 1.06 g/cm$^3$ and a closed pore volume of 0.29 cm$^3$/g. When 3 g of these coffee granules was re-constituted as described above, the amount of foam on the beverage surface was observed to be significantly greater than commercially available freeze-dried coffee granules, and the foam layer was observed to fully cover the beverage surface even after the beverage had been stirred. The foam volume upon re-constitution as measured by the quantitative in-cup foam test was 3 cm$^3$ after 1 minute, and 1 cm$^3$ after 10 minutes.

It was noted that the freeze-dried particles of size less than 500 μm generated a very large amount of foam when re-constituted as described above. It is contemplated that these fine particles, which were of similar appearance to a spray-dried coffee powder, consisted partly of particles of the foamable component that had not been sufficiently dispersed into the aqueous coffee extract so as to remain entrapped in the granules after granulation of the frozen slab. It is thought that these particles retained the majority of their entrapped gas at superatmospheric pressure, even after the freeze-drying process.

Table 4 (below) summarises the results of additional experiments carried out to illustrate some of the features of the invention. All closed pore volumes in this Example were calculated relative to the true density of this soluble coffee which was measured to be 1.53 g/cm$^3$.

TABLE 4

| Experimental details | Bulk density (g/cm³) | Tapped bulk density (g/cm³) | Skeletal density (g/cm³) | Closed pore volume (cm³/g) | Foam volume (cm³) 1 minute | Foam volume (cm³) 10 minutes |
|---|---|---|---|---|---|---|
| Composition produced by the method of Example 1 | 0.228 | 0.237 | 1.06 | 0.29 | 3 | 1 |
| Composition produced by the method of Example 1 but without the addition of foamable component | 0.269 | 0.284 | 1.4 | 0.07 | 0.5 | 0 |
| Composition produced by the method of Example 1 but with the addition of 120 g of foamable component to coffee extract cooled to +5° C. | 0.221 | 0.232 | 1.21 | 0.17 | 2 | 0.5 |
| Composition produced by the method of Example 1 but with the addition of 120 g of foamable component to coffee extract cooled to −5° C. | 0.223 | 0.235 | 1.16 | 0.21 | 3 | 0.5 |
| Composition produced by the method of Example 1 but with the addition of 60 g of foamable component | 0.231 | 0.248 | 1.19 | 0.19 | 1.5 | 0 |
| Composition produced by the method of Example 1 but with the addition of 120 g of non-pressure-treated foamable component* | 0.269 | 0.293 | 0.65 | 0.87 | 2 | 0 |
| Composition produced by the method of example 1 but using pressure-treated freeze-dried coffee granules as the foamable component | 0.275 | 0.284 | 1.23 | 0.15 | 5 | 1 |

*The granules were generally spheroid in appearance and did not resemble standard freeze-dried coffee granules Example 2

The following example demonstrates the benefits of the present invention in instant freeze-dried soluble coffee composition reconstituted with 200 cm³ of hot (85° C.) water in a 250 cm³ beaker having a 65 mm internal diameter.

An instant freeze-dried soluble coffee composition was prepared following the method of Example 1, using a spray-dried maltodextrin-based foamable component in place of the spray-dried soluble coffee foamable component of example 1.

This maltodextrin-based foamable component was prepared according to the following procedures. A quantity of porous spray-dried powder consisting of 92% maltodextrin and 8% modified food starch, (having a mean particle size (D50) of about 130 µm as measured by laser diffraction with 0% of particles >500 µm) containing a plurality of closed pores was loaded into a pressure vessel. This maltodextrin-based powder had a glass transition temperature (Tg) of about 100° C. and closed pore volume of about 0.9 cm³/g. The pressure vessel was pressurised with nitrogen to a pressure of about 40 bars gauge. The vessel, was then heated by means of an external heating jacket to a temperature in excess of 145° C., above the glass transition temperature of the maltodextrin-based powder. The vessel and contents were held at this temperature for a period of about 10 minutes. The vessel was then cooled to a temperature of about 50° C., below the glass transition temperature of the maltodextrin-based powder, thus trapping a portion of nitrogen at superatmospheric pressure inside the closed pores of the maltodextrin-based powder. The vessel was de-pressurised and the maitodextrin-based powder was un-loaded. When 3 g of this maltodextrin-based powder containing entrapped nitrogen at superatmospheric pressure was added to 11.5 g of an instant cappuccino mix comprised of soluble coffee, conventional foaming creamer powder, and sugar, and reconstituted as described above, the height of the foam (measured between the surface of the liquid and the top of the foam) was in excess of 30 mm. In contrast, the height of the foam created without addition of the pressurized powder was about 10 mm. Knowledge of the foam density and incremental foam volume was used to estimate the amount (corrected to room temperature and pressure) of gas released by the foaming agent to at least about 15 cm³ per gram of powder at ambient temperature (25° C.).

The maltodextrin-based foamable component was cooled and mixed into a coffee extract and frozen, granulated, freeze dried and sieved, by the method of example 1, to produce a granular foaming instant freeze-dried coffee composition. The granules were substantially brown in colour, with clearly visible particles of spray-dried powder of a lighter colour embedded within the granule matrix. Also visible were particles consisting of agglomerates of light-coloured spray-dried particles bound by the darker-coloured coffee matrix.

The granules had a bulk density of 0206 µg/cm³, a tapped bulk density of 0.216 g/cm³, a skeletal density of 1.19 g/cm³ and a closed pore volume of 0.18 cm³/g.

When 3 g of these granules was re-constituted as described above, the amount of foam on the beverage surface was observed to fully cover the beverage surface even after the beverage had been stirred, and indeed persisted to substantially cover the beverage surface 5 minutes after re-constitution. The foam volume upon re-constitution as measured by the quantitative in-cup foam test was 4 cm$^3$ after 1 minute, and 1.75 cm$^3$ after 10 minutes.

A composition was also produced by the method of example 2 but with the foamable component at ambient temperature (approximately 20° C.) prior to addition to the coffee extract. The resulting foaming freeze-dried coffee composition had a bulk density of 0.233 g/cm$^3$, a tapped bulk density of 0.245 g/cm$^3$, a skeletal density of 1.17 g/cm$^3$ and a closed pore volume of 0.19 cm$^3$/g. When re-constituted as described above, a layer of foam was formed which fully covered the beverage surface even after the beverage had been stirred. The foam volume upon reconstitution as measured by the quantitative in-cup foam test was 4 cm$^3$ after 1 minute and 1.5 cm$^3$ after 10 minutes.

All closed pore volumes in this example were calculated relative to the true density of this coffee composition which was measured to be 1.51 g/cm$^3$.

Example 3

The following Example illustrates the production of a granular foaming instant coffee composition by steam agglomeration of an instant soluble coffee powder and particles of a foamable component.

A quantity of instant spray-dried soluble coffee powder was milled, thereby destroying all closed pores, and was then blended with the foamable component of Example 2, such that the foamable component constituted 25 wt % of the blended powder composition.

This blended composition was formed into granules using a steam agglomeration device known as and hereinafter referred to as an instantiser, supplied by ICF INDUSTRIE CIBEC S.p.a., Maranello, Italy. The blended composition was made to fall through a grid of aperture size 2.5 cm and was impinged by a steam flow. A portion of this steam condensed on the particle surfaces, causing the particles to adhere to one another, thus forming agglomerated particles comprising an instant coffee matrix containing entrapped particles of the foamable component. These agglomerated particles were then passed to a rotating drum drying chamber where hot air at a temperature of about 110° C. was used to remove moisture from the agglomerated particles such that the moisture content of the final composition was lower than about 5 wt %.

The final composition was then sieved to remove any fine or un-agglomerated particles with a particle size less than 500 µm.

The dimensions of the grid, the product and steam flow rate and the drying temperature can be readily adjusted by one skilled in the art in order to form granules of a desired shape and general appearance. It was found that by using the parameters shown below in Table 5 the agglomerated particles could beneficially be made to resemble the shape and general appearance of and have similar bulk density to a standard freeze-dried instant coffee, said agglomerated particles comprising an instant coffee matrix with particles of foamable component entrapped therein. In addition, it was found that the structure of the foamable component entrapped within said agglomerated particles was substantially retained, such that the agglomerated particles had a closed pore volume of 0.10 cm$^3$/g, with the closed pores containing an entrapped gas.

When 3 g of the final composition was reconstituted with 200 cm$^3$ of hot (85° C.) water at in a 250 cm$^3$ beaker having a 65 mm internal diameter, a layer of foam was observed to fully cover the beverage surface even after the beverage had been stirred, and indeed persisted to substantially cover the beverage surface 5 minutes after re-constitution.

TABLE 5

| Experimental details | wt % foamable component (%) | Steam flow rate (kg/hr) | Bulk density (g/cm$^3$) | Tapped bulk density (g/cm$^3$) | Skeletal density (g/cm$^3$) | True density (g/cm$^3$) |
|---|---|---|---|---|---|---|
| Composition produced by the method of Example 3 but without the addition of foamable component | 0 | 40 | 0.275 | 0.292 | 1.48 | 1.48 |
| Composition 1 produced by the method of Example 3 | 25 | 40 | 0.269 | 0.298 | 1.31 | 1.51 |
| Composition 2 produced by the method of Example 3 | 25 | 40 | 0.252 | 0.271 | 1.31 | 1.51 |

| Experimental details | Closed pore volume (cm$^3$/g) | Foam volume (cm$^3$) 1 minute | Foam volume (cm$^3$) 10 minutes |
|---|---|---|---|
| Composition produced by the method of example 3 but without the addition of foamable component | 0.00 | 0 | 0 |
| Composition produced by the method of example 3 | 0.10 | 4 | 1.75 |
| Composition produced by the method of example 3 | 0.10 | 4 | 1.5 |

Example 4

Freeze-dried coffee granules were reconstituted with an equal amount of hot water to produce a coffee extract with a solids concentration of approximately 50%. This coffee extract was chilled to approximately 5° C. and foamed through the addition of nitrogen gas to give an extract with a foamed extract density of 810 g/l. The coffee extract was then further cooled to approximately −5° C.

Into 40 g of the coffee extract were mixed 10 g of alpha-cyclodextrin-$CO_2$ clathrate crystals. The resulting mixture was frozen to a temperature below −40° C. and freeze-dried. The freeze-dried product was manually granulated after drying and sieved to remove fines having a size of less than 500 μm.

A control sample was also produced by the same method but without the addition of the clathrate crystals.

The sample containing the clathrates swelled slightly during drying compared with the control sample and had a bulk density of 0.18 g/cm$^3$. The sample had a skeletal density of 1.29 g/cm$^3$ and a true density of 1.49 g/cm$^3$, giving a closed pore volume of 0.10 cm$^3$/g. The sample had the general appearance of standard freeze-dried coffee granules but with some white crystals entrapped therein. It was found that the sample containing clathrate crystals provided significantly more foaming once re-constituted with hot water and stirred, both immediately after stirring and after 5 minutes. The foam volume upon reconstruction as measured by the quantitative in-cup foam test was 2.75 cm$^3$ after 1 minutes and 1.5 cm$^3$ after 10 minutes. The control sample (with no foamable component added prior to drying) had no foam.

Example 5

This example relates to instant freeze-dried soluble coffee reconstituted with 200 cm$^3$ of hot (85° C.) water in a 250 cm$^3$ beaker having a 65 mm internal diameter.

Instant freeze-dried soluble coffee was prepared according to the following procedures. First an aqueous coffee extract was produced by dissolving instant freeze-dried coffee granules, of moisture content about 2% by weight, in an equal quantity of hot water. This aqueous coffee extract was then cooled to a temperature of about 5° C. The cooled aqueous coffee extract was then foamed to a density of about 0.8 g/cm$^3$ by the introduction of nitrogen gas whilst being subjected to mixing at a high shear level in order to uniformly disperse the entrained gas bubbles within the cooled aqueous coffee extract. The foamed aqueous coffee extract was then further cooled to a temperature of about −10° C., and further mixed to ensure homogeneity.

A foamable component was prepared according to the following procedures. First, a quantity of freeze-dried soluble coffee granules comprising particles of between about 500 microns and about 3 mm in size were loaded into a pressure vessel. This soluble coffee had a glass transition temperature (Tg, measured by Differential Scan calorimetry, DSC) of about 60° C., bulk density of about 0.24 g/cm$^3$ and closed pore volume of about 0.02 cm$^3$/g. The pressure vessel was pressurised with nitrogen to a pressure of about 40 bars gauge.

The vessel was then heated by means of an external heating jacket to a temperature in excess of 90° C., above the glass transition temperature of the soluble coffee. The vessel and contents were held at this temperature for a period of about 10 minutes. The vessel was then cooled to a temperature of about 30° C., below the glass transition temperature of the soluble coffee. The vessel was depressurised and the soluble coffee was unloaded.

The resulting soluble coffee granules had a bulk density of 0.62 g/cm$^3$, a skeletal density of 1.17 cg/cm$^3$ and a closed pore volume of 0.20 cm$^3$/g.

The closed pore volume of the freeze-dried soluble coffee granules increased substantially as a result of the above-mentioned pressure treatment, which may result from closure of some open pores and/or from creation of some new closed pores between fused particles during heating.

When 3 g of these soluble coffee granules containing entrapped nitrogen at superatmospheric pressure were reconstituted as described above, the height of the foam (measured between the surface of the liquid and the top of the foam) was in excess of 21 mm. In contrast, the height of the foam created when the granules prior to pressure treatment were reconstituted as described above was too small to be practicably measurable, i.e. <1 mm. Knowledge of the foam density and incremental foam volume was used to estimate the amount (corrected to room temperature and pressure) of gas released by the foamable component to at least about 15 cm$^3$ per gram of powder at ambient temperature (25° C.).

A quantity of the foamable component was mixed by hand (using a spoon) into the cooled foamed aqueous coffee extract. This mixing process took about 2 minutes. The foamable component was not cooled prior to mixing, and hence the temperature of the foamable component prior to mixing was about 20° C. The resulting mixture was then cooled to a temperature below about −30° C. in order to form a solid slab, by passing the solid slab through a CES linear freezing tunnel. The freezing tunnel uses the vaporisation of liquid nitrogen both to produce a flow of cooled air which is blasted at the slab by means of a series of fans, and to directly cool the product by vaporisation of liquid nitrogen on the product surface inside the freezing tunnel. The freezing tunnel was set to operate at an internal air temperature of −70° C., and the slab residence time in the tunnel was set to approximately 4 minutes. The slab was passed through the tunnel three times to ensure complete freezing. After freezing, the solid slab was stored overnight in a freezer at a temperature of about −65° C., before being granulated using a granulator located inside a cold-room at about −40° C. Water was then removed from the resulting granules by the sublimation of ice to water vapour through the standard process of freeze-drying under partial vacuum.

The resulting freeze-dried coffee product was then sieved in order to separate any particles less than 500 μm from the freeze-dried coffee granules, which closely resembled standard commercial freeze-dried coffee granules, although particles of the foamable component embedded into the coffee granules were visible upon close visual inspection. The granules had a bulk density, tapped bulk density, skeletal density and closed pore volume as indicated blow in TABLE 6. When 3 g of these coffee granules was re-constituted as described above, the amount of foam on the beverage surface was observed to be significantly greater than commercially available freeze-dried coffee granules, and the foam layer was observed to fully cover the beverage surface even after the beverage had been stirred. The foam volume upon re-constitution as measured by the quantitative in-cup foam test is shown below in TABLE 6.

It was noted that the freeze-dried coffee particles produced by the method of EXAMPLE 5 produced a noticeable cracking sound upon re-constitution with hot water, indicating the presence of pressurised gas within the closed pores of the foamable component embedded within the freeze-dried granule matrix.

The slightly greater foam volume produced when using a freeze-dried foamable component compared to using a spray-dried foamable component may be due to the reduced propensity of the freeze-dried foamable component to dissolve in the aqueous chilled coffee extract compared to the spray-dried foamable component.

All closed pore volumes in this Example were calculated relative to the true density of this soluble coffee which was measured to be 1.53 g/cm$^3$.

TABLE 6

| Experimental details | Quantity of foamable component (g) | Quantity of coffee extract (g) | Product bulk density (g/cm$^3$) | Product tapped bulk density (g/cm$^3$) | Product skeletal density (g/cm$^3$) | Product closed pore volume (cm$^3$/g) |
|---|---|---|---|---|---|---|
| Composition produced by the method of EXAMPLE 5 | 80 | 600 | 0.184 | 0.209 | 1.18 | 0.19 |
| Composition produced by the method of EXAMPLE 5 | 160 | 480 | 0.275 | 0.284 | 1.23 | 0.16 |

| Experimental details | Quantity of foamable component (g) | Quantity of coffee extract (g) | Foam volume (cm$^3$) 1 minute | Foam volume (cm$^3$) 10 minutes |
|---|---|---|---|---|
| Composition produced by the method of EXAMPLE 5 | 80 | 600 | 3.0 | 1.0 |
| Composition produced by the method of EXAMPLE 5 | 160 | 480 | 5.0 | 1.0 |

The invention claimed is:

1. A foaming instant coffee composition comprising particles having a bulk density of from 0.16 to 0.45 g/cm$^3$, said particles comprising a continuous phase comprising an instant coffee matrix and a non-continuous phase comprising particles of a foamable component containing a gas, the non-continuous phase being entrapped within the instant coffee matrix.

2. The composition according to claim 1 wherein the particles have a continuous phase comprising a freeze dried instant coffee matrix having entrapped therein a non-continuous phase comprising the particles of the foamable component.

3. The composition according to claim 1 wherein the particles have a continuous phase comprising agglomerated instant coffee particles and a non-continuous phase comprising particles of the foamable component.

4. The composition according to claim 1 wherein the composition particles have a closed pore volume of at least 0.10 cm$^3$/g.

5. The composition according to claim 1 wherein the foamable component comprises a spray-dried carbohydrate-based powder or a spray-dried instant coffee powder.

6. The composition according to claim 1 wherein the instant coffee matrix also comprises a sugar and/or whitener.

7. The composition according to claim 1 which comprises from 10 to 50 wt % of the foamable component relative to the total weight of the composition.

8. The composition according to claim 1 wherein the foamable component comprises a particulate ingredient having a plurality of internal voids containing entrapped gas under superatmospheric pressure or comprises a particulate ingredient having a plurality of internal voids containing condensed liquid or supercritical fluid.

9. The composition according to claim 1 wherein the foamable component is a gas-containing clathrate.

10. A process for preparing a coffee drink, which comprises adding hot water to a composition as defined in claim 1.

11. A foaming instant coffee composition comprising particles having a bulk density of from 0.16 to 0.45 g/cm$^3$, said particles comprising a continuous phase comprising an instant coffee matrix having therein entrapped a non-continuous phase comprising particles of a foamable component containing a gas, wherein the foamable component comprises a particulate ingredient having a plurality of internal voids containing entrapped gas under superatmospheric pressure or comprises a particulate ingredient having a plurality of internal voids containing condensed liquid or supercritical fluid.

12. A foaming instant coffee composition comprising particles having a bulk density of from 0.16 to 0.45 g/cm$^3$, said particles comprising a continuous phase comprising an instant coffee matrix having therein entrapped a non-continuous phase comprising particles of a foamable component containing a gas, the foamable component being provided in an amount of 10 to 50 wt. % of the total weight of the composition, the foaming instant coffee composition having a skeletal density of less than about 1.3 g/cm$^3$, wherein the foamable component comprises a particulate ingredient having a plurality of internal voids containing entrapped gas under superatmospheric pressure or comprises a particulate ingredient having a plurality of internal voids containing condensed liquid or supercritical fluid, the foamable component having a closed pore volume of at least about 0.10 cm$^3$/g and releases the gas in an amount of at least about 15 cm$^3$/g when added to a liquid.

13. The composition according to claim 1, wherein the foamable component releases the gas in an amount of at least about 15 cm$^3$/g when added to a liquid.

14. The composition according to claim 4, wherein the foamable component releases the gas in an amount of at least about 15 cm³/g.

* * * * *